(12) United States Patent
DeWerd et al.

(10) Patent No.: US 8,044,365 B2
(45) Date of Patent: Oct. 25, 2011

(54) HIGH-RESOLUTION ION CHAMBER

(75) Inventors: Larry A. DeWerd, Madison, WI (US); Brian D. Hooten, Middleton, WI (US); Edward W. Neumueller, Verona, WI (US)

(73) Assignee: Standard Imaging, Inc., Middleton, WI (US)

( * ) Notice: Subject to any disclaimer, the term of this patent is extended or adjusted under 35 U.S.C. 154(b) by 198 days.

(21) Appl. No.: 12/542,850

(22) Filed: Aug. 18, 2009

(65) Prior Publication Data

US 2010/0038528 A1     Feb. 18, 2010

Related U.S. Application Data

(60) Provisional application No. 61/089,751, filed on Aug. 18, 2008.

(51) Int. Cl.
  *G01T 1/185*     (2006.01)

(52) U.S. Cl. .................................. 250/385.1; 250/374

(58) Field of Classification Search ............... 250/385.1, 250/375, 374, 394
  See application file for complete search history.

(56) References Cited

U.S. PATENT DOCUMENTS

| | | | | | |
|---|---|---|---|---|---|
| 2,445,305 | A | * | 7/1948 | Hochgesang | 250/266 |
| 2,756,348 | A | * | 7/1956 | Schneider | 250/385.1 |
| 3,119,036 | A | * | 1/1964 | Braestrup et al. | 313/93 |
| 3,729,631 | A | * | 4/1973 | Pszona | 250/392 |

FOREIGN PATENT DOCUMENTS

| | | | |
|---|---|---|---|
| JP | 58174876 A | * | 10/1983 |
| JP | 11038143 A | * | 2/1999 |

* cited by examiner

*Primary Examiner* — Constantine Hannaher
(74) *Attorney, Agent, or Firm* — Boyle Fredrickson, S.C.

(57) ABSTRACT

Nested ionization chambers provide independent measurements of a radiation beam that does not fully irradiate the volume of one or both chambers. By mathematically combining these independent measurements, partial volume effects caused by a change in ionization detector calibrations when the full detector volume is not irradiated by the radiation beam, may be decreased, providing more accurate measurement of extremely small radiation beams.

16 Claims, 3 Drawing Sheets

HIGH-RESOLUTION ION CHAMBER

CROSS-REFERENCE TO RELATED APPLICATIONS

This application claims priority from previously filed U.S. Provisional Patent Application Ser. No. 61/089,751 filed on Aug. 18, 2008 hereby incorporated by reference in its entirety.

BACKGROUND OF THE INVENTION

External beam radiation therapy systems provide beams of high-energy directed into a patient to treat tumors or the like. The size, location, angle and intensity of the beams are determined by a treatment plan based upon the precise measurement of the dose to be delivered to the patient to provide for precise control of the dose to the patient.

Quantitative accuracy is ensured by periodic calibration of the machine using radiation detectors and phantoms to determine the relationship between the control settings of the machine and actual dose. One type of radiation detector is an ionization chamber in which electrodes are placed on opposite sides of a volume of gas. The gas is ionized by the radiation passing through the chamber volume and the ions are collected on one collector electrode under the influence of a voltage applied across the electrodes.

Ideally the ionization chamber volume is small compared to the beam size to limit "partial volume" errors that affect the ionization chamber measurement when the volume is not fully irradiated by the measured radiation beam.

Certain radiation therapy systems, for example, the Gamma Knife® or a linear accelerator configured for stereotactic radiotherapy or radiosurgery, provide extremely small radiation beams, for example, as small as 4 mm. It is difficult to construct ionization detectors that are small enough to avoid partial volume effects while providing desired sensitivity.

SUMMARY OF THE INVENTION

The present invention provides an ionization chamber having two measurement volumes, one substantially surrounding the other, either or both of which may be larger than the desired measured radiation field. By using the readings from the two chambers of different sizes, it is possible to detect and or correct for the partial volume effects.

Specifically then, the present invention provides a nested radiation detector system having a first radiation detector being an ionization detector defining a first volume and providing for the detection of ionized gas in the first volume at a first collection electrode and a second radiation detector positioned within the first volume and defining a second volume within the first volume and providing for the detection of radiation in the second volume to produce a signal at a second collection electrode, the first volume being electrically separated from the second volume. Radiation passing through the second volume also passes through the first volume providing current at the first and second collection electrodes from the ionization of gas in the first and second volumes. The second radiation detector may be an ionization detector or a diode detector, a diamond detector, a scintillation detector or the like.

It is thus a feature of at least one embodiment of the invention to provide a radiation detector system that may be used to detect and correct for partial volume effects where the radiation beam is smaller than one of the ionization chambers or beam misalignment. It is further a feature of at least one embodiment of the invention to provide for the measurement of dose from narrow radiation beams where partial volume effects for reasonably sized ionization detectors will be present.

At least one of the first and second radiation detectors may provide an outer chamber wall constructed of an air equivalent material.

It is thus a feature of at least one embodiment of the invention to permit the construction of nested ionization detectors without adversely changing the energy spectrum of the radiation beam such as may unacceptably change the calibration of either detector.

The outer chamber wall of the first and/or second chamber may be a conductive polymer material or a non-conductive material having an internally applied conductive coating.

It is thus a feature of at least one embodiment of the invention to provide for simple fabrication of the outer chamber such as from easily machined or molded polymer materials.

The second volume may be substantially centered within the first volume.

It is thus a feature of at least one embodiment of the invention to minimize the effects of the angle of the measured beam on the relationship between the measurements of the ionization chambers used for the partial volume correction.

The first radiation detector may provide an outer chamber wall that is substantially spherical.

It is thus a feature of at least one embodiment of the invention to minimize the effect of the angle of the radiation beam on the measurements.

Each of the first and second ionization chambers includes two electrically independent electrodes forming the outer surfaces of the first and second volumes respectively.

It is thus a feature of at least one embodiment of the invention to permit fabrication of the device using a pre-existing ionization chamber.

The first radiation detector may provide a hollow shaft leading to the first volume and the second ionization chamber may be removable and slidably received within the hollow shaft against a stop locating the second volume in a predetermined position within the first volume.

It is thus a feature of at least one embodiment of the invention to permit removal and independent use of the first or second ionization detector when partial volume effects are not at issue.

The ionization chamber system may further include an electrometer receiving ionization signals from the first and second ionization chambers to provide a correction for at least one of the ionization chambers to accommodate partial volume effects caused by radiation beams having an axial cross-section smaller than a corresponding cross-section of the second volume along the axis.

It is thus a feature of at least one embodiment of the invention to provide automatic correction of partial volume effects.

The nested ionization chamber system may further include a third ionization chamber surrounded by the first volume and providing for the detection of ionized gas in a third volume at a third collection electrode, the third volume being isolated from the second volume wherein radiation passing through the first volume also passes through the third volume providing current at the first and third collection electrodes from the ionization of gas in the first and third volumes.

It is thus a feature of at least one embodiment of the invention to provide for improved correction for partial volume effects through the use of an additional chamber.

Other features and advantages of the invention will become apparent to those skilled in the art upon review of the follow-

DETAILED DESCRIPTION OF THE PREFERRED EMBODIMENT

Figure 1:
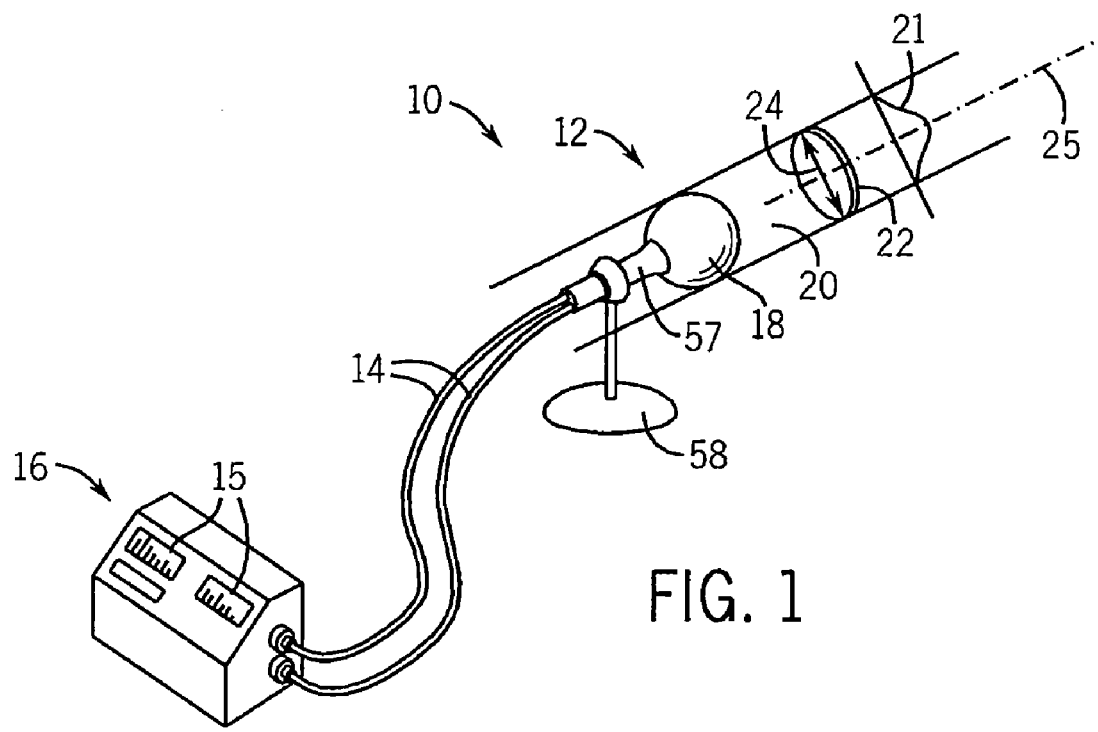
FIG. 1 is a simplified perspective view of an embodiment of an ion chamber system according to the present invention as positioned within a radiation beam.

Referring now to FIG. 1, the present invention provides an ion chamber system 10 including a detector assembly 12 connected by electrical cables 14 to an electrometer unit 16. In use, a detector head 18 of the detector assembly 12 may be positioned within a radiation beam 20 to be exposed to the beam 20. As will be described below, the detector head 18 contains two independent ionization detectors one within the other and each attached to a separate cable 14. In one embodiment, the electrometer unit 16 may provide for two displays 15 each outputting a dose measurement received from one of the ionization detectors.

Generally, the radiation beam 20 will have a cross-sectional area 22 taken perpendicular to an axis 25 of the beam 20 along which the radiation propagates. For beams 20 with cross-sectional areas 22, a beam width 24 may be defined related to the cross-sectional area 22.

Figure 2:
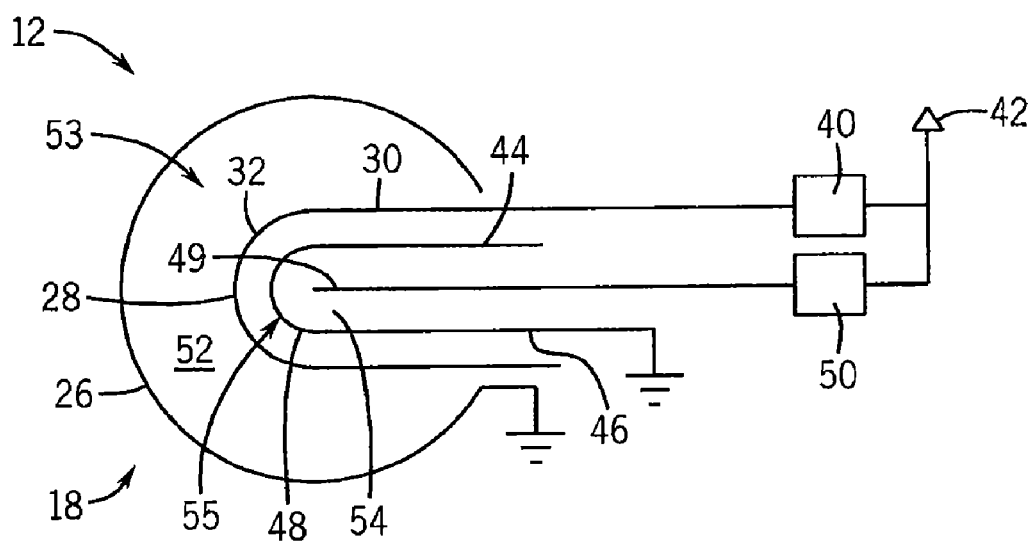
FIG. 2 is a schematic representation of one embodiment of the ion chamber system of FIG. 1 showing nested radiation detectors.

Referring now to FIG. 2, the detector head 18 of the detector assembly 12 may provide a substantially spherical outer electrode 26, for example, enclosing an approximately 100 cm³ volume. The outer electrode 26 may be constructed of an air equivalent conductive plastic providing radiation absorption characteristics approximating that of air. Such plastic material is commercially available, for example, under the trade name Shonka C552. Alternatively, the outer electrode 26 may be constructed of an air equivalent polymer or a non-air equivalent material having an internal conductive coating. This outer electrode 26 may be connected to ground potential at an internal power supply to the electrometer unit 16.

The outer electrode 26 may fit around a second electrode 28 providing a cylindrical tube 30 terminating with a hemispherical portion 32. The hemispherical portion 32 preferably describes a portion of a sphere where the sphere has a common center with a sphere describing the outer electrode 26. The second electrode 28 may be a conductive material or conductive layer on the outer surface of an insulating support. The conductive element of this second electrode 28 will be connected through a current sensor 40 to a power source 42 of high voltage electricity, for example, at 300 volts. Together the outer electrode 26 and second electrode 28 provide a first ionization detector 53 sensitive to the volume 52 between the outer electrode 26 and second electrode 28.

The second electrode 28 may in turn fit around a third electrode 44 conforming in profile to the second electrode 28 but with smaller dimensions to fit therein. The third electrode 44 may thus also provide a tubular portion 46 capped by a hemispherical portion 48 also describing a portion of a sphere centered on the center of the sphere describing the outer electrode 26. The third electrode 44 encloses, for example, a volume of approximately 0.007 cm³. The third electrode 44 may also be a conductive material or a conductive layer on an insulating support, and in either case is connected to ground.

Coaxially centered within the tubular portion 46 of the third electrode 44 is a conductive wire electrode 49 terminating substantially at a center of the sphere describing the outer electrode 26. This wire electrode 49 is connected through a second current sensor 50 to a source of high voltage from power source 42. Together the third electrode 44 and wire electrode 49 provide a second ionization detector 55 sensitive to the volume 54 between the third electrode and wire electrode 49 and within the volume 52 but isolated therefrom to prevent exchange of electrons therebetween.

It will be understood that electrons formed in a gaseous volume 52 inside the outer electrode 26 and outside the second electrode 28 will migrate to be collected by the second electrode 28 to be measured by current sensor 40. Similarly, electrons formed in a volume 54 within the third electrode 44 will be collected by the wire electrode 49 and measured by current sensor 50.

The current readings by current sensors 40 and 50 provide an indication of the dose of radiation passing through the respective volumes 52 and 54 according to principles well understood in the art.

Figure 3:
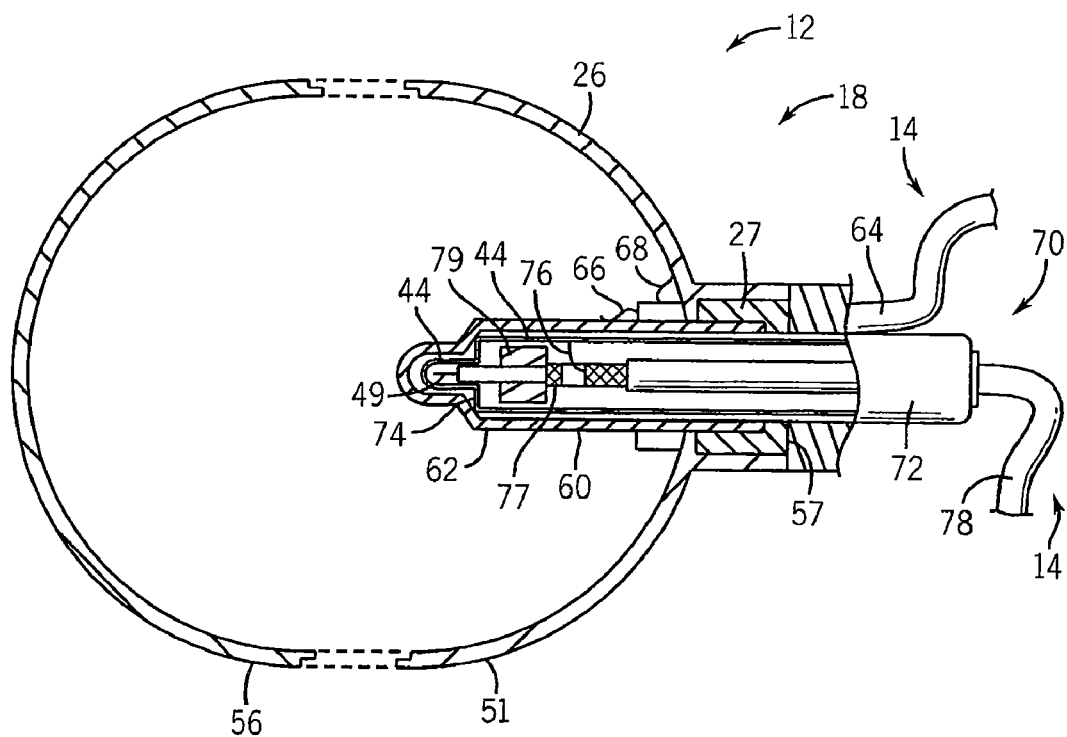
FIG. 3 is a fragmentary, detailed cross-sectional view of the ion chamber system of FIG. 2.

Referring now to FIG. 3, in construction, the outer electrode 26 may be formed from two interfacing hemispherical half shells 51 and 56 may be adhered together with conductive adhesive, or mechanically and conductively joined. Shell 51 may be threadably attached to a stem 57 extending radially therefrom and providing support for the detector assembly 12, as shown in FIG. 1, by means of a stand 58 or the like. Attached to the stem is an interdetector wall 60 having an outer dimension conforming generally to that of second electrode 28 and in the preferred embodiment being an insulating material with an outer conductive coating or conductive material 62.

A triaxial cable 64, forming one of the cables 14, may be received through an offset bore in the stem 57 with its innermost conductor 66 electrically attached to the conductive coating or conductive material 62 and its outer shield braid 68 attached to a conductive portion of shell 51 and its inner shield braid (not shown) attached to a conductive inner electrode 27.

A separate ionization probe 70 may have its stem 72 inserted in a central bore in stem 57 to slide therein to stop against the inner surface of the interdetector wall 60 to be properly positioned within the volume described by outer electrode 26. This probe 70, for example, may be a standard ionization probe such as the model A16 Exradin Microchamber ionization chamber manufactured by Standard Imaging, Inc. of Middleton, Wis. or its equivalent.

The probe 70 provides the wire electrode 49 centered within a housing 74 nesting within the interdetector wall 60. The housing 74 have a conductive inner surface forming the third electrode 44 and attached to an outer shield braid 76 of a triaxial cable 78 forming a second of the cables 14. The center conductor of the triaxial cable 78 may provide for the wire electrode 49 and an inner shield braid 77 may attached to an electrode 79 similar in function to electrode 27 described above.

Figure 5:
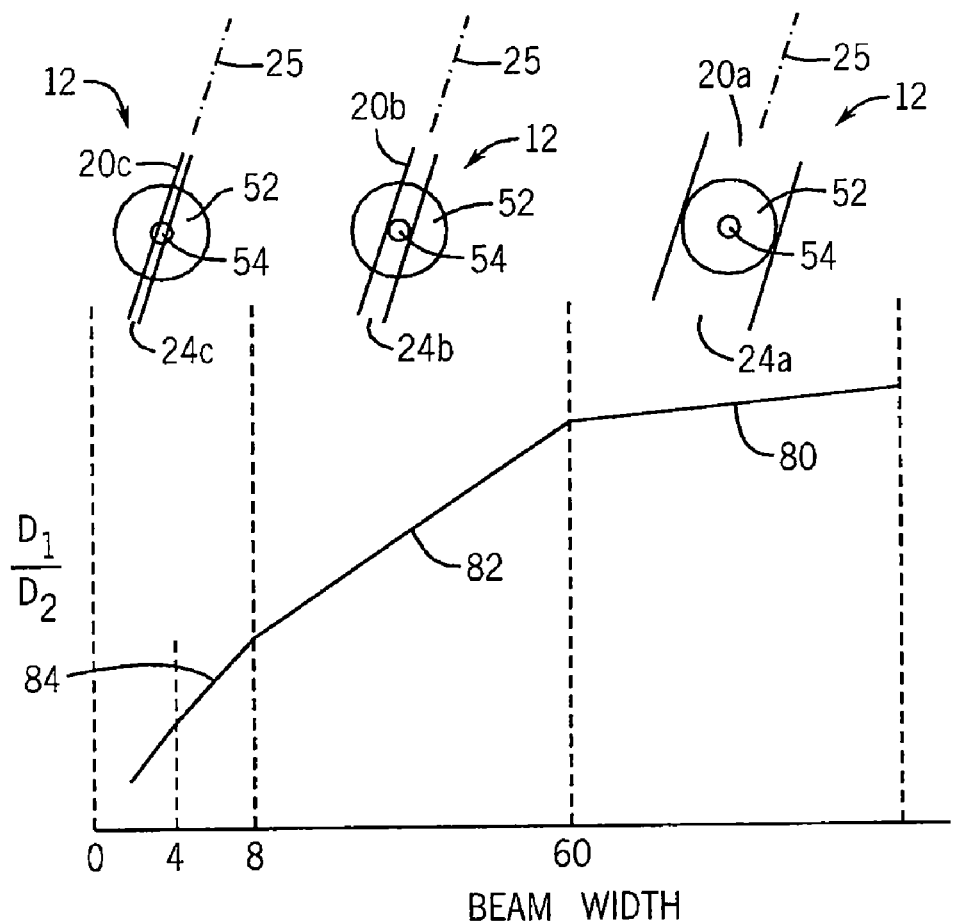
FIG. 5 is a plot showing example functional relationships between the calibrated outputs of the nested radiation detectors for different beam widths as may be used to correct for partial volume effects.

Referring now to FIG. 5, the detector assembly 12 may provide for accurate dose measurements of radiation beams 20 of various beam widths 24a-24c including those (beam width 24b and 24c) that do not fully irradiate the volumes 52 and/or 54. Such beams would be expected to cause partial volume effects that occur when the volume of an ionization detector is not fully irradiated by the radiation beam. Partial volume effects are caused by either or both of a tailing off of the intensity 21 of the beam 20 at the edges of the beam 20 and a decrease in the volume of gas within the detector that may interact with radiation so as to generate ionized current. These partial volume effects may be compensated for mathematically through the measurements made by the detector assembly 12.

The process of correction for partial volume effects may begin with an empirical or theoretical modeling of the operation of the detector assembly 12 with a range of widths 24 of beams 20 including, for example, beam width 24a that fully irradiates the entire volumes 52 and 54 of the ionization detectors 53 and 55 of detector assembly 12, a beam width 24b that fully irradiates all of volume 54 but only partially irradiates volume 52, and beam width 24c that partially eliminates both volumes 52 and 54. In each of these situations, two readings may be collected from the detector assembly 12 using electrometer unit 16.

These readings are then corrected or calibrated for temperature, pressure, a geometric calibration factor, and other factors known in the art, excluding partial volume effects. The calibrated readings may produce reading D1 from the ionization detector 53 associated with volume 52 and reading D2 from the ionization detector 55 associated with volume 54. These readings may be displayed on displays 15 of electrometer unit 16.

For large beam widths 24a, shown in FIG. 5 as those greater than 60 mm, a ratio of the two dose readings (i.e., D1/D2) as a function 80 of beam width 24 will be constant and have a value of unity reflecting the fact that neither ionization detectors 53 and 55 are subject to partial volume effects and are fully and correctly calibrated.

This ratio will start to drop as the beam width narrows to width 24b and thus fails to fully irradiate volume 52 causing a partial volume decrease in the value of D1 with respect to dose D2 as a function 82 of beam size. This region may, for example, extend between 8 mm and 60 mm of beam width 24b. The function 82 is related to the characterization of detector 53.

For small beam widths 24c, the ratio D1/D2 will be a different function 84 of beam width 24 driven by partial volume decreases in the values of both D1 and D2. The function 84 is related to the characterizations of detectors 53 and 55.

This collected data of functions 80, 82 and 84 may then be used to detect and/or correct for partial volume effects during calibration of the radiation therapy machine. In this process, the detector assembly 12 may be used to collect data of D1 and D2 for a known beam size W. In a first step, the ratio of the measured readings D1 and D2 may be taken and compared to the ratio indicated by the previously determined functions 80, 82 and 84 (depending on the beam size) using a preprepared chart or table similar to that described with respect to FIG. 5. If the indicated ratio for the beam size does not match, an alignment problem may exist in which the beam 20 is not centered on the volume 54. In such cases the ratio will be smaller than suggested by FIG. 5. The process may end at this point if alignment is the only issue.

If the alignment is correct, the values of D1 and D2 may be corrected. In a simple example of this correction process, the ratio of D1/D2 taken from a chart similar to FIG. 5 (based on known beam width) is simply multiplied by the reading of D2 to obtain a corrected value of D2 without or with reduced partial volume effects.

Figure 4:
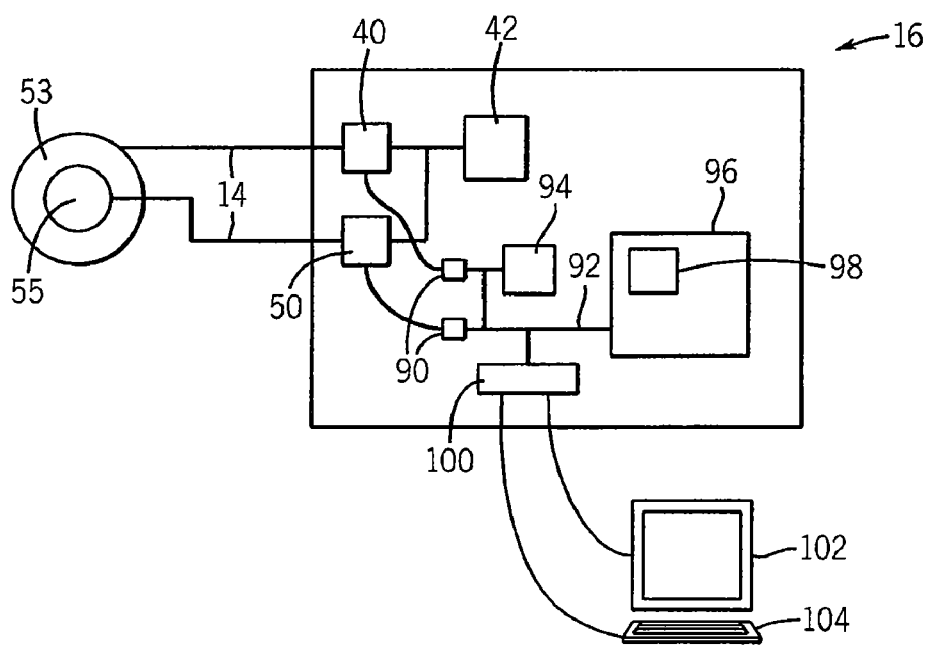
FIG. 4 is a block diagram of an electrometer suitable for use in the present invention.

Referring now to FIG. 4, the above calculations (and the data of a table per FIG. 5 providing functions 80, 82 and 84) may be incorporated into a computerized electrometer unit 16. Such an electrometer unit 16 receives signals over cable 14 from each of the ionization detectors 53 and 55 at the current sensors 40 and 50 as described before as powered by power source 42. The measured currents may be provided to analog to digital converters 90 which provide data through a common bus 92 to a processor 94. The processor 94 may communicate with a memory 96 holding a stored program 98 incorporating the calculations described above. Information about the measurement (beam width W) may be entered through a keyboard 104, touchscreen or other method and the calculated actual dose corrected according to the equations described above may be presented on graphic display terminal 102. Both the graphic display terminal 102 and the keyboard 104 may connect to the bus 92 via interface 100.

Figure 6:
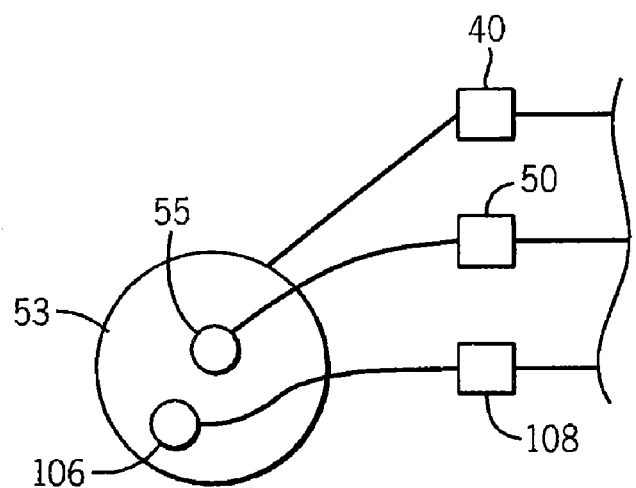
FIG. 6 is a simplied diagram of an alternative embodiment of the present invention using three radiation detectors.

Referring now to FIG. 6, improved accuracy may be obtained by the use of more than one concentric ionization chamber, for example, by adding a third ionization detector 106 within ionization detector 53 and the addition of an additional current sensor 108 to the electrometer unit 16 this arrangement allows data from this detector 106 to be used to augment that collected by the other detectors 53 and 55.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A ionization chamber system comprising:
    a radiation detector providing an ionization detector defining a first volume and providing for a detection of ionized gas in the first volume at a first collection electrode;
    a second radiation detector positioned within the first volume and defining a second volume within the first volume and providing for the detection of radiation in the form of an electrical signal at a second collection electrode, the first volume being electrically separated from the second volume;
    wherein radiation passing through the second volume also passes through the first volume providing current at the first and second collection electrodes;
    further including an computer executing a stored program and receiving radiation signals from the first and second radiation detectors to provide a correction for at least one of the radiation signals by evaluating the signals of the first and second radiation detector to correct for partial volume effects caused by radiation beams having an axial cross-section smaller than a corresponding cross-section of the first volume along the axis.

2. The ionization chamber system of claim 1 wherein the second detector is selected from the group consisting of a diode detector, a diamond detector, a scintillation detector and an ionization chamber.

3. The ionization chamber system of claim 1 including a first outer chamber wall surrounding the first volume and a second outer chamber wall surrounding the second volume and wherein at least one of the outer chamber walls is constructed of an air equivalent material.

4. The ionization chamber system of claim 3 wherein at least one of the outer chamber walls is a conductive polymer material.

5. The ionization chamber system of claim 3 wherein at least one of the outer chamber walls is a non-conductive material having a surface applied conductive coating.

6. The ionization chamber system of claim 1 wherein the second volume is substantially centered within the first volume.

7. The ionization chamber system of claim 1 wherein the first radiation detector provides an outer chamber wall that is substantially spherical.

8. The ionization chamber system of claim 1 wherein each of the first and second radiation detectors are ionization chambers and include two electrically independent electrodes defining outer surfaces of the first and second volumes respectively.

9. The ionization chamber system of claim 1 wherein the first radiation detector provides a hollow shaft communicating with the first volume and wherein the second radiation detector is removably and slidably received within the hollow shaft against a stop locating the second volume in a predetermined position within the first volume.

10. The ionization chamber system of claim 1 wherein the second radiation detector has a cross-sectional width of less than the first radiation detector.

11. The ionization chamber system of claim 1 further including a third radiation detector within the first volume and providing for the detection of radiation in a third volume at a third electrode, the third volume being separated from the first volume wherein radiation passing through the first volume also passes through the third volume providing current at the first and third electrodes.

12. The ionization chamber system of claim 11 wherein the second and third radiation detectors are selected from the group consisting of a diode detector, a diamond detector, a scintillation detector and an ionization chamber.

13. A method of measuring radiation beams from a radiation therapy machine comprising the steps of:
(a) exposing an ionization chamber system to a least one radiation beam having a beam cross-sectional area along a beam axis, the ionization system having:
a first radiation detector providing an ionization detector defining a first volume having a first cross-sectional area along the beam axis larger than the beam cross-sectional area and providing for a detection of ionized gas in the first volume at a first collection electrode;
a second radiation detector positioned within the first volume and defining a second volume smaller than the first volume and having a second cross-sectional area along the beam axis smaller than the first cross-sectional area and providing for the detection of radiation in the second volume at a second collection electrode, the first volume being isolated from the second volume;
wherein radiation passing through the second volume also passes through the first volume providing current at the first and second collection electrodes from the ionization of gas in the first and second volumes;
(b) analyzing the current at the first and second collection electrodes to reduce partial volume errors in a measurement of dose deduced from the first and second currents.

14. The method of claim 13 wherein the step of analyzing, uses a known ratio of measured doses of radiation from the first and second radiation detectors as a function of a cross sectional measure of the radiation beam to correct for partial volume effects.

15. A method of measuring radiation beams from a radiation therapy machine comprising the steps of:
(a) exposing an ionization chamber system to a least one radiation beam having a beam cross-sectional area along a beam axis, the ionization system having:
a first radiation detector defining a first volume having a first cross-sectional area along the beam axis larger than the first cross-sectional area and providing for a detection of ionized gas in the first volume at a first collection electrode;
a second radiation detector positioned within the first volume and defining a second volume smaller than the first volume and having a second cross-sectional area along the beam axis smaller than the first cross-sectional area and providing for the detection of ionized gas in the second volume at a second collection electrode, the first volume being isolated from the second volume;
wherein radiation passing through the second volume also passes through the first volume providing current at the first and second collection electrodes from the ionization of gas in the first and second volumes;
(b) analyzing the current at the first and second collection electrodes to determine misalignment of the radiation beam with respect to the second radiation detector.

16. The method of claim 15 wherein the step of analyzing, uses a known ratio of measured doses of radiation from the first and second radiation detectors as a function of the cross sectional measure of the radiation beam to detect misalignment when an actual doses deduced from the first and second currents deviates from this known ratio.

* * * * *